April 24, 1928.

A. CHURCHWARD 1,667,244

ELECTRIC WELDING APPARATUS

Filed Nov. 8, 1926

INVENTOR.
ALEXANDER CHURCHWARD.
BY Williams & Cross
ATTORNEYS

Patented Apr. 24, 1928.

1,667,244

UNITED STATES PATENT OFFICE.

ALEXANDER CHURCHWARD, OF NEW YORK, N. Y., ASSIGNOR TO WILSON WELDER & METALS COMPANY, INC., OF HOBOKEN, NEW JERSEY, A CORPORATION OF NEW YORK.

ELECTRIC-WELDING APPARATUS.

Application filed November 8, 1926. Serial No. 147,145.

The present invention relates to electric welding apparatus.

It is well known to those conversant with the art of electric arc welding that a shunt or under compounded direct current generator is slow to recover its open circuit voltage from full load to no load conditions, when it is operating at a low point on the saturation curve of its field. If, however, when the load is taken off the generator by opening the welding circuit, the shunt field rheostat is simultaneously short-circuited or moved to a low resistance position, the recovery of the voltage of the generator to its open circuit value will be rapid.

The general object of the present invention is to provide means for automatically short-circuiting the shunt field rheostat of such a generator when the welding circuit is suddenly changed from full load to no load conditions, as by removing the electrode from the work and breaking the arc, thereby causing the generator to very rapidly recover its normal open circuit voltage. As will be hereinafter explained, such automatic means is such that the short-circuiting of the shunt field rheostat is continued only for a sufficient time to allow the generator to recover its open circuit voltage, whereupon said short-circuiting is discontinued, leaving the shunt field rheostat effective at the setting appropriate to the normal open circuit voltage of the generator.

Figure 1:
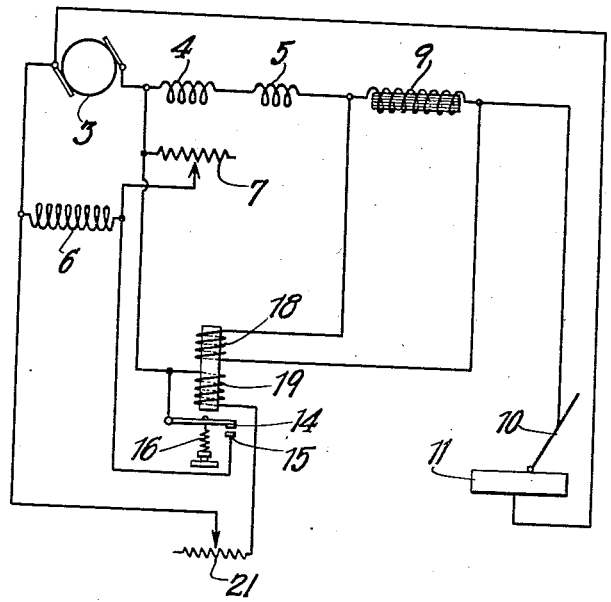
Figure 2:
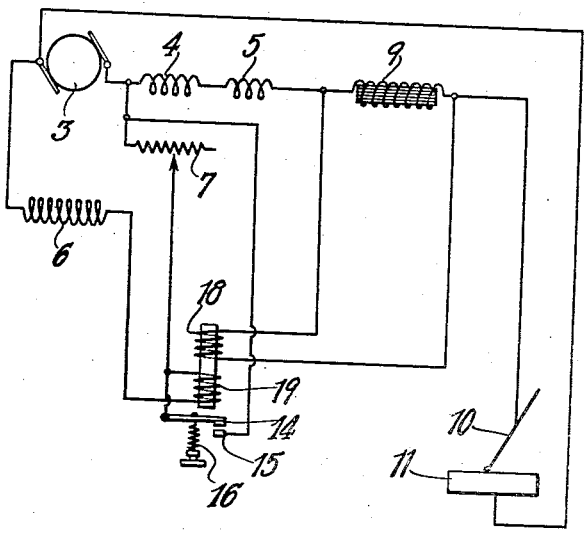

The invention will be understood from the following description, taken in connection with the accompanying drawing, in which Figure 1 shows diagrammatically one form of the invention; and Figure 2 shows diagrammatically another form of the invention.

Referring to Figures 1 and 2, 3 indicates the armature, 4 the inter-pole series field, and 5 the main series field of an under compounded direct current generator having a shunt field 6 capable of being regulated by an adjustable field rheostat 7. One of the generator brushes is shown connected through the series field windings 4 and 5 and a current carrying device 9 with the welding electrode 10 which cooperates with the part to be welded, indicated at 11, which is connected to the other brush of the generator. The current carrying device 9 is herein shown as a choke coil which functions as a resistance of low value when the welding current is steady, and as a reactance when the welding current fluctuates.

In both forms of the invention, an electromagnetically operated switch or relay is provided having movable and fixed contacts 14 and 15 which, when closed under the influence of the adjustable spring 16, short-circuit the shunt field rheostat 7. Each relay is provided with a winding 18, the current in which is proportional to the current in the welding circuit because said winding is connected either directly in the welding circuit or across the current carrying device 9. Each relay is also provided with another winding 19 which is connected either in multiple with the shunt field as shown in Figure 1, or in series with the shunt field as shown in Figure 2. In the form of the invention shown in Figure 1, a manually adjustable rheostat 21 is shown arranged in series with the relay winding 19, for reasons which will hereinafter be explained.

In both forms of the invention, the relay coils 18 and 19 are connected so as to act accumulatively. The relay winding 18 is so designed that, when current is flowing in the welding circuit, the energization of this coil will be sufficient to cause the movable contact 14 to move away from the fixed contact 15 of the relay, against the closing effect exerted by the spring 16; and the winding 19 of each relay is so designed that when a predetermined voltage is generated at the brushes of the generator, the energization of the winding 19 will cause the movable contact 14 to move away from the fixed contact 15 of the relay, against the closing effect exerted by the spring 16.

Let us assume that the shunt field rheostat 7 has been set at such a position that the generator is delivering 35 volts under open circuit conditions, that is while the electrode 10 is out of engagement with the work 11. While this open circuit or no load condition continues, there is no current flowing in the relay winding 18, but the relay winding 19 is sufficiently energized to hold the movable contact 14 out of engagement with the fixed contact 15, thereby leaving the rheostat 7 effective in the shunt field circuit. When the arc is struck by bringing the electrode 10 into engagement with the work 11, the voltage supplied by the generator may fall to perhaps 16 to 18 volts, depending upon the length of the arc struck, and current will flow in the welding circuit. This reduction in the voltage supplied by the generator will decrease the current in the relay winding 19 but the consequent weakening of the magnetization of the relay will be compensated for by the winding 18 which is now receiving current from the welding circuit. The contacts of the relay are thus held open while welding is in progress. When the arc is broken by moving the electrode 10 out of engagement with the work 11, the current in the welding circuit is interrupted, with consequent cessation of current in the relay winding 18; and the current supplied to the relay winding 19 under the low voltage condition of the generator at the time the arc was broken is not sufficient to maintain the contacts of the relay open against the closing effect of the spring 16. The contacts 14 and 15, therefore, close and short-circuit the shunt field rheostat 7. This short-circuiting of the shunt field rheostat causes the voltage of the generator to rise rapidly from its closed circuit voltage of 16 to 18 volts to its normal open circuit voltage which was assumed to be 35 volts. When the voltage of the generator has risen sufficiently to so energize the relay winding 19 as to cause the relay contacts to open, the short circuit across the rheostat 7 is interrupted, thereby making it effective in the shunt field circuit. The generator is now restored to its open circuit condition, under which it delivers 35 volts.

In the form of the invention shown in Figure 1, the manually adjustable rheostat 21 arranged in series with the relay winding 19, permits adjustment so that the relay contacts will open at any predetermined open circuit voltage. If desired, the shunt field rheostat 7 and the relay rheostat 21 may be so interlocked that one manual adjustment will affect both rheostats, thereby simplifying the control system and insuring rapid recovery of the open circuit voltage of the generator, at any open circuit voltage for which the field rheostat 7 may be set.

Adjustment of the tension of the spring 16 may also be employed to regulate the open circuit voltage at which the relay contacts 14 and 15 are opened.

It will be understood that one of the advantages of having the winding 19 in series with the shunt field, as shown in Figure 2, is that the heating effect of the shunt field and the relay winding 19 will be inter-dependent. This connection will also tend to reduce any delay in opening the relay contacts at the predetermined open circuit voltage of the generator, as this open circuit voltage is dependent upon the current flowing in the shunt field. As the relay winding 19 is connected in series with the shunt field 6, it will cause the relay contacts 14 and 15 to open promptly when the predetermined open circuit voltage of the generator has been restored.

I claim:

1. In combination with a direct current generator having a shunt field and a rheostat in the circuit thereof, said generator being adapted to supply current to a welding circuit, means responsive to the opening of the welding circuit and to sub-normal open-circuit voltage at the brushes of the generator for short-circuiting said rheostat.

2. In combination with a direct current generator having a shunt field and a rheostat in the circuit thereof, said generator being adapted to furnish current to a welding circuit, an electro-magnetically operated switch having contacts adapted to close a short circuit around said rheostat, said switch being provided with an operating coil energized by current in the welding circuit and capable of holding said contacts open and with an operating coil connected to the generator brushes and adapted to hold said contacts open when the generator voltage is substantially normal.

3. In combination with a direct current generator having a shunt field and a rheostat in the circuit thereof, said generator being adapted to furnish current to a welding circuit, an electro-magnetically operated switch having contacts biased to a closed position adapted to close a short circuit around said rheostat and provided with cumulatively acting operating coils, one of which holds said contacts open while current is flowing in the welding circuit, and the other of which holds said contacts open when the voltage at the brushes of the generator is at substantially its normal open circuit value.

4. In combination with a direct current generator having a shunt field and a rheostat in the circuit thereof, said generator being adapted to furnish current to a welding circuit, an electro-magnetically operated switch having contacts adapted to close a short circuit around said rheostat and provided with cumulatively-acting operating coils, one of which is energized by current in the welding circuit, and the other of which is energized by current proportional to the voltage at the generator brushes.

5. In combination with a direct current generator having a shunt field and a rheostat in the circuit thereof, said generator being adapted to furnish current to a welding circuit, an electro-magnetically operated switch having contacts adapted to close a short circuit around said rheostat and provided with two cumulatively-acting operating coils, one of which is connected in shunt to a resistance in the welding circuit, and the other of which is connected to the brushes of the generator.

6. In combination with a direct current generator having a shunt field and a rheostat in the circuit thereof, said generator being adapted to furnish current to a welding circuit, an electro-magnetically operated switch having contacts adapted to close a short circuit around said rheostat and provided with two cumulatively-acting operating coils, one of which is connected in shunt to a resistance in the welding circuit, and the other of which is connected in series with said shunt field.

7. In combination with a direct current generator having a shunt field and a rheostat in the circuit thereof, said generator being adapted to furnish current to a welding circuit, an electro-magnetically operated switch having contacts adapted to close a short circuit around said rheostat and provided with two cumulatively-acting operating coils, one of which is connected in shunt to a resistance in the welding circuit and the other of which is connected to the generator brushes, and a variable resistance included in the circuit of said last mentioned operating coils.

In testimony whereof, I have affixed my signature to this specification.

ALEXANDER CHURCHWARD.